(12) United States Patent
Ayukawa

(10) Patent No.: US 10,597,081 B2
(45) Date of Patent: Mar. 24, 2020

(54) VEHICLE FRONT PORTION STRUCTURE

(71) Applicant: TOYOTA JIDOSHA KABUSHIKI KAISHA, Toyota-shi, Aichi-Ken (JP)

(72) Inventor: Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 16/027,845

(22) Filed: Jul. 5, 2018

(65) Prior Publication Data

US 2019/0023321 A1 Jan. 24, 2019

(30) Foreign Application Priority Data

Jul. 18, 2017 (JP) .................................. 2017-139329

(51) Int. Cl.
| | | |
|---|---|---|
| *B62D 21/03* | (2006.01) | |
| *B60K 1/04* | (2019.01) | |
| *B62D 21/15* | (2006.01) | |
| *B62D 25/20* | (2006.01) | |
| *B62D 25/02* | (2006.01) | |
| *B62D 25/08* | (2006.01) | |
| *B62D 21/11* | (2006.01) | |

(52) U.S. Cl.
CPC .............. *B62D 21/03* (2013.01); *B60K 1/04* (2013.01); *B62D 21/152* (2013.01); *B62D 25/2018* (2013.01); *B62D 25/2045* (2013.01); *B60K 2001/0438* (2013.01); *B62D 21/11* (2013.01); *B62D 21/15* (2013.01); *B62D 25/025* (2013.01); *B62D 25/082* (2013.01); *B62D 25/2036* (2013.01)

(58) Field of Classification Search
CPC ................ B62D 21/03; B62D 25/2018; B62D 25/2036; B62D 25/2045; B60K 1/04
See application file for complete search history.

(56) References Cited

U.S. PATENT DOCUMENTS 6,227,322 B1 * 5/2001 Nishikawa .............. B60R 16/04
180/65.1
2009/0145676 A1 6/2009 Takasaki et al.
(Continued)

FOREIGN PATENT DOCUMENTS

| JP | 2009-137408 A | 6/2009 | |
|---|---|---|---|
| JP | 2013-67255 A | 4/2013 | |
| WO | WO-2016/012663 A1 * | 1/2016 | ............... B60K 1/04 |

*Primary Examiner* — Jason S Morrow
(74) *Attorney, Agent, or Firm* — Oliff PLC

(57) ABSTRACT

A vehicle front portion structure includes: a dash cross-member extending in a vehicle width direction at a lower portion in a vehicle vertical direction of a dash panel, the dash panel being configured to partition between a power unit compartment provided at a vehicle front portion and a vehicle cabin, and the dash cross-member being a first framework member of which a cross-sectional shape when cut along the vehicle front-rear direction forms a first chamber portion between the dash cross-member and the dash panel; and a battery pack that extends in the vehicle width direction and the vehicle front-rear direction at the vehicle lower side of a floor panel that structures a floor portion of the vehicle cabin, a front end portion in the vehicle front-rear direction of the battery pack being joined to the dash cross-member.

5 Claims, 5 Drawing Sheets

(56) References Cited

U.S. PATENT DOCUMENTS

| | | | |
|---|---|---|---|
| 2012/0161472 A1* | 6/2012 | Rawlinson | B60K 1/04 296/187.08 |
| 2014/0374180 A1* | 12/2014 | Katayama | B60K 1/04 180/68.5 |
| 2015/0048652 A1* | 2/2015 | Maeda | B62D 21/15 296/187.08 |
| 2017/0120951 A1* | 5/2017 | Ashraf | B62D 21/03 |
| 2018/0194212 A1* | 7/2018 | Hamilton | B60K 1/04 |
| 2018/0361857 A1* | 12/2018 | Shimizu | B62D 21/02 |
| 2019/0009662 A1* | 1/2019 | Toyota | B60K 1/04 |
| 2019/0047628 A1* | 2/2019 | Kawase | B62D 21/157 |
| 2019/0047633 A1* | 2/2019 | Sawai | B60K 15/03006 |
| 2019/0092395 A1* | 3/2019 | Makowski | B60K 1/04 |
| 2019/0157642 A1* | 5/2019 | Toyota | H01M 2/1077 |
| 2019/0210659 A1* | 7/2019 | Choi | B60K 1/04 |
| 2019/0255928 A1* | 8/2019 | Erlacher | B60K 1/04 |
| 2019/0255957 A1* | 8/2019 | Milton | B60K 1/04 |
| 2019/0263276 A1* | 8/2019 | Otoguro | B60L 50/66 |
| 2019/0275875 A1* | 9/2019 | Fukui | B62D 21/11 |
| 2019/0276080 A1* | 9/2019 | Otoguro | B60K 1/04 |
| 2019/0276081 A1* | 9/2019 | Otoguro | B60K 1/04 |

* cited by examiner

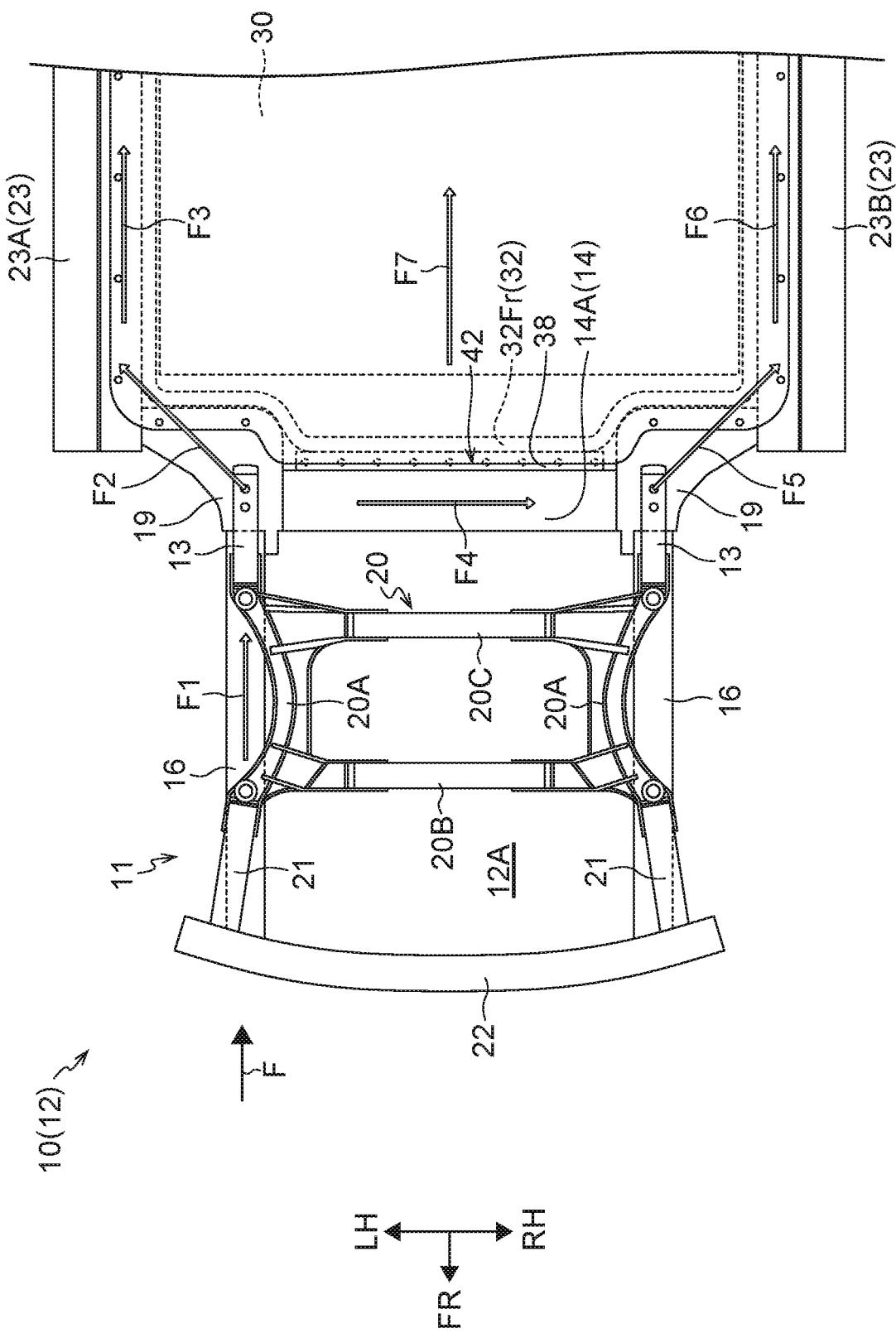

VEHICLE FRONT PORTION STRUCTURE

CROSS-REFERENCE TO RELATED APPLICATION

This application is based on and claims priority under 35 USC 119 from Japanese Patent Application No. 2017-139329 filed on Jul. 18, 2017, the disclosure of which is incorporated by reference herein.

BACKGROUND

Technical Field

The present disclosure relates to a vehicle front portion structure.

Related Art

Japanese Patent Application Laid-Open (JP-A) No. 2013-67255 discloses a technology relating to an electric car (simply "the vehicle" below) in which a battery is mounted at the lower side of a floor panel. In this vehicle, side members ("the front side members" below) at both of end portions in the vehicle width direction of a vehicle front portion ("the vehicle front portion" below) each extend in the vehicle front-rear direction. Two end portions in the vehicle width direction of a battery case are fastened to the front side members via brackets. Hence, the battery case is supported at the front side members.

However, in this technology, the two end portions in the vehicle width direction of the battery case are fastened at brackets as described above, but a front end portion of the battery case is unsecured. Therefore, there is scope for improvement in regard to effectively dispersing a collision load applied to the vehicle front portion when a front collision of the vehicle occurs.

SUMMARY

In consideration of the circumstances described above, the present disclosure provides a vehicle front portion structure that may effectively disperse a collision load applied to the vehicle front portion during a front collision of the vehicle.

An aspect of the present disclosure is a vehicle front portion structure including: a dash cross-member extending in a vehicle width direction at a lower portion in a vehicle vertical direction of a dash panel, the dash panel being configured to partition between a power unit compartment provided at a vehicle front portion and a vehicle cabin, and the dash cross-member being a first framework member of which a cross-sectional shape when cut along the vehicle front-rear direction forms a first chamber portion between the dash cross-member and the dash panel; and a battery pack that extends in the vehicle width direction and the vehicle front-rear direction at the vehicle lower side of a floor panel that structures a floor portion of the vehicle cabin, a front end portion in the vehicle front-rear direction of the battery pack being joined to the dash cross-member.

In the vehicle front portion structure according to the present aspect, the power unit compartment provided at the vehicle front portion is partitioned from the vehicle cabin by the dash panel. The dash cross-member that serves as the first framework member extends in the vehicle width direction at the lower portion in the vehicle vertical direction of the dash panel. In the cross section cut along the vehicle front-rear direction, the dash cross-member forms the first chamber portion with the dash panel. The battery pack extends in the vehicle width direction and the vehicle front-rear direction at the vehicle lower side of the floor panel structuring the floor portion of the vehicle cabin. The front end portion in the vehicle front-rear direction of the battery pack is joined to the dash cross-member.

Therefore, during a front collision of the vehicle, when a collision load applied from the vehicle front side is transmitted to the front end portion of the battery pack, the collision load is transmitted to the dash cross-member via a joining portion at which the front end portion of the battery pack is joined to the dash cross-member. Because the dash cross-member that is the first framework member forms the first chamber portion with the dash panel, the collision load is able to be transmitted by the dash cross-member.

Further, because the dash cross-member extends in the vehicle width direction, the collision load can be transmitted in the vehicle width direction via the dash cross member. That is, in the present disclosure, a collision load applied to the vehicle front portion during a front collision of the vehicle is able to be dispersed via the dash cross-member.

The meaning of the term "joining" as used herein is intended to include, besides fastening with fasteners or the like, bonding by welding or the like, adhesion with an adhesive, and so forth.

As described hereabove, the vehicle front portion structure according to the present aspect may effectively disperse a collision load applied to the vehicle front portion during a front collision of the vehicle.

In the present aspect, the front end portion in the vehicle front-rear direction of the battery pack may include a second framework member of which a cross-sectional shape when cut along the vehicle front-rear direction forms a second chamber portion, and the second framework member may be joined to the dash cross-member.

In the structure described above, because the front end portion of the battery pack forms the second chamber portion in the cross section cut along the vehicle front-rear direction and serves as the second framework member, the collision load may also be transmitted by the front end portion of the battery pack (i.e., the second framework member).

In this structure, the front end portion of the battery pack and the dash cross-member are joined via the joining portion as described above. That is, the front end portion of the battery pack that is the second framework member is joined to the dash cross-member that is the first framework member via the joining portion. Therefore, stiffness of the joining portion vicinity is higher than in a structure in which the dash cross-member is the only framework member at the joining portion. Thus, deformations of the front end portion of the battery pack and the dash cross-member are suppressed. In other words, in the present disclosure, load withstand capability of the joining portion is improved and load transmission efficiency is raised.

Thus, in the vehicle front portion structure with the structure described above, withstand load capability of the front end portion of the battery pack and the dash cross-member may be improved, and load transmission efficiency during a front collision of the vehicle may be raised.

The present aspect may further include a pair of rockers disposed at each of two outer sides in the vehicle width direction of the floor panel, the rockers each extending in the vehicle front-rear direction, and each of two end portions in the vehicle width direction of the battery pack may be joined to the respective rocker.

In the structure described above, the pair of rockers are respectively provided at the two outer sides in the vehicle width direction of the floor panel, and the pair of rockers each extend in the vehicle front-rear direction. The two end portions in the vehicle width direction of the battery pack are joined to the corresponding rockers.

Therefore, a collision load applied to the vehicle front portion during a front collision of the vehicle is dispersed via the dash cross-member, and a collision load transmitted to the battery pack is transmitted in the vehicle width direction via the framework members and is transmitted to the sides of the rockers joined to the two end portions in the vehicle width direction of the battery pack. That is, the collision load may be dispersed more easily than in a structure in which a battery pack is joined only at the front and rear in the vehicle front-rear direction.

Thus, the vehicle front portion structure described above may disperse the collision load more easily than a structure in which a battery pack is joined only at the front and rear in the vehicle front-rear direction.

BRIEF DESCRIPTION OF THE DRAWINGS

An exemplary embodiment of the present disclosure will be described in detail based on the following figures, wherein:

FIG. 5 is a bottom view, corresponding to FIG. 2, for describing operation of the vehicle front portion structure according to the exemplary embodiment.

DETAILED DESCRIPTION

Figure 1:
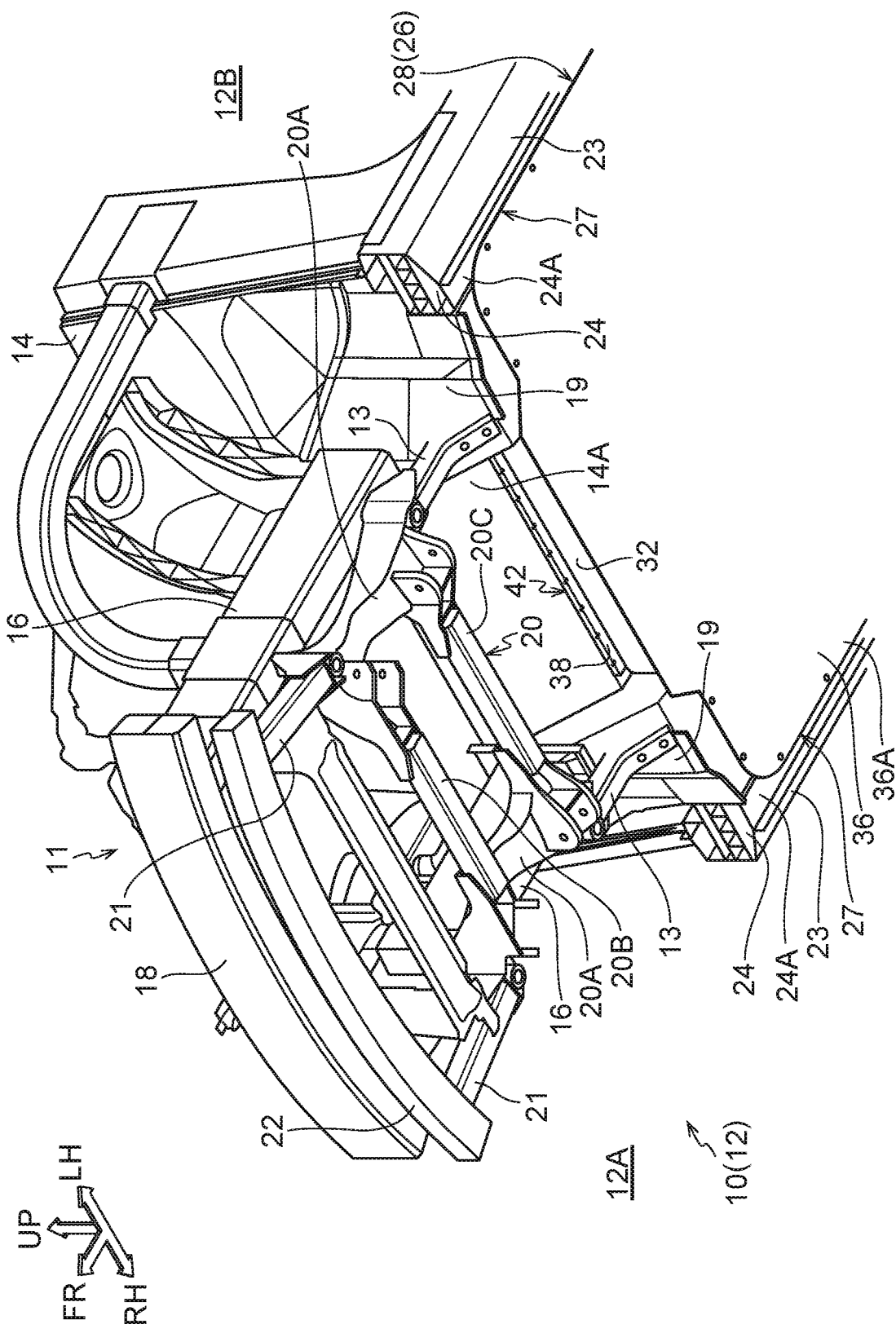
FIG. 1 is a perspective view, seen from diagonally below the front left, illustrating schematics of a vehicle front portion of a vehicle in which a vehicle front portion structure according to an exemplary embodiment is employed.

Below, a vehicle body (vehicle) 12 of an electric vehicle in which a vehicle front portion structure 10 according to an exemplary embodiment is employed is described using FIG. 1 to FIG. 5. The arrow FR, arrow UP, arrow LH and arrow RH that are marked in the drawings indicate, respectively, a front direction (progress direction), an upper direction, a left direction and a right direction of the vehicle. Below, where descriptions are given simply using directions to front and rear, left and right, and up and down, unless particularly specified, these refer to front and rear in the vehicle front-rear direction, left and right in the vehicle left-and-right direction (the vehicle width direction), and up and down in the vehicle vertical direction. Some of the reference symbols may be omitted in some of the drawings to aid viewing of the drawings.

—Structure of the Vehicle Front Portion Structure—

First, structures of the vehicle front portion structure 10 according to the exemplary embodiment are described.

As shown in FIG. 1, the vehicle 12 is an electric car, including a power unit compartment 12A and a vehicle cabin 12B. The power unit compartment 12A and the vehicle cabin 12B are partitioned by a dash panel 14. The power unit compartment 12A is disposed to the front side of the vehicle cabin 12B.

Although not illustrated in the drawings, the power unit compartment 12A is capable of accommodating various members thereinside, such as electric components, a gearbox, auxiliary equipment and the like. A left and right pair of front side members 16 are provided at the power unit compartment 12A, at both of side portions in the vehicle width direction of the vehicle 12. The front side members 16 extend in the vehicle front-rear direction.

Each front side member 16 configures a vehicle framework member. A front cross-member 18 that extends in the vehicle width direction at vehicle front end portions is joined to each of the front end portions of the front side members 16 by welding, fastening or the like. Note that joining methods of joins between members are not described herebelow unless particularly limited. Of course, separate crash boxes that serve as collision-absorbing members may be interposed between the respective front end portions of the front side members 16 and the front cross-member 18.

Rear end portions of the front side members 16 are respectively joined to front end portions of front side member rear portions 19. Rear end portions of the front side member rear portions 19 are joined to front ends of rockers 23 and to a kick portion 14A disposed at a lower portion of the dash panel 14. In the exemplary embodiment, the front side member rear portions 19 are formed as separate members from the front side members 16 and joined to the front side members 16. However, the front side member rear portions 19 may be formed integrally with the front side members 16.

A suspension member 20 is provided at the lower side of the front side members 16. The suspension member 20 supports front suspensions, which are not shown in the drawings. The suspension member 20 is supported so as to hang down from the front side members 16. A left and right pair of suspension member side rails 20A are provided at both of side portions in the vehicle width direction of the suspension member 20. The suspension member side rails 20A each extend in the vehicle front-rear direction.

Figure 2:
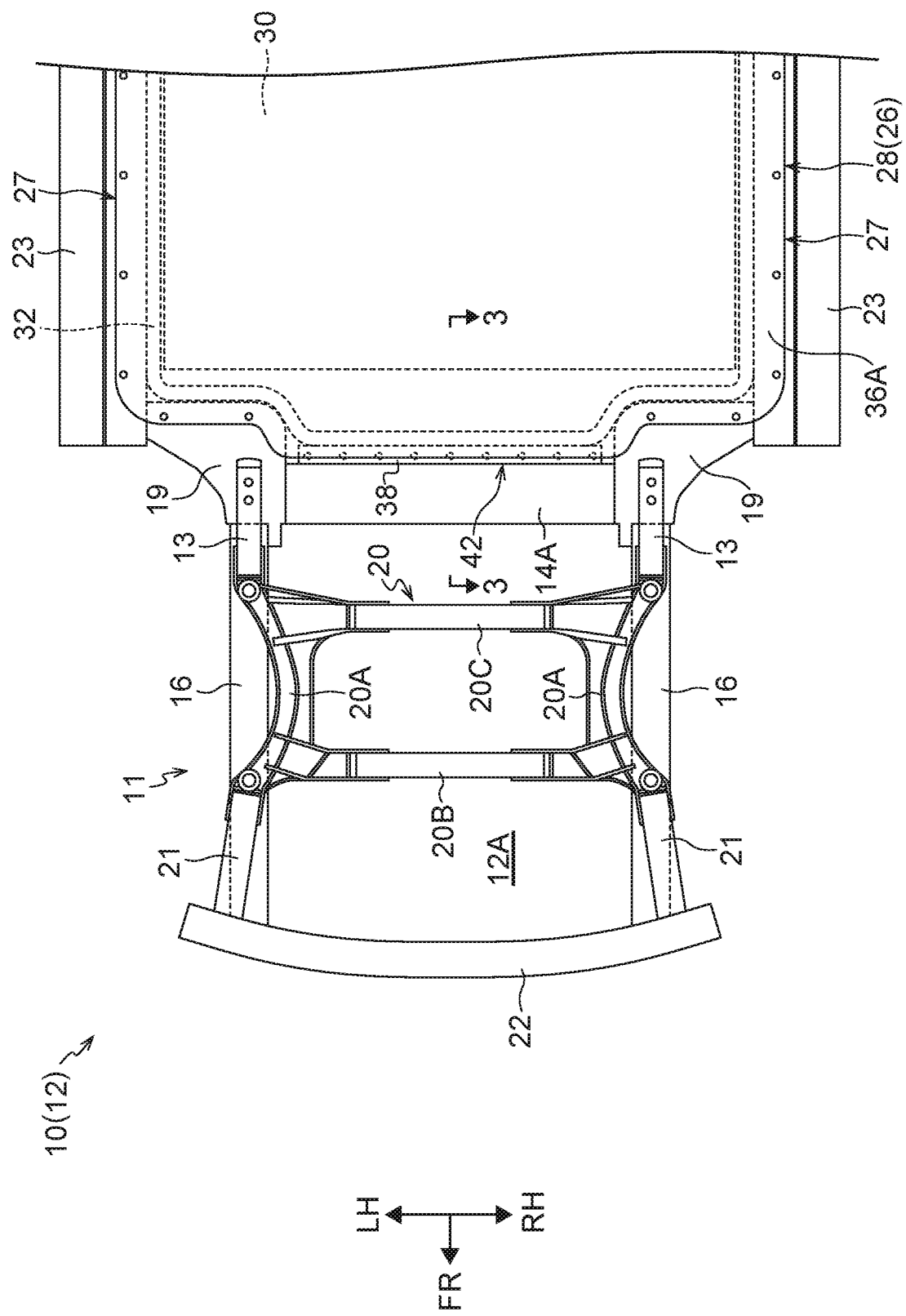
FIG. 2 is a bottom view illustrating structures of the vehicle front portion of the vehicle in which the vehicle front portion structure according to the exemplary embodiment is employed.

As shown in FIG. 2, each of the suspension member side rails 20A is formed in a shape of which a vehicle front-rear direction central portion is gently curved so as to form a protrusion toward the inner side in the vehicle width direction. A front cross-member 20B spans in the vehicle width direction between front end portions of the pair of suspension member side rails 20A. A rear cross-member 20C spans in the vehicle width direction between rear end portions of the suspension member side rails 20A.

Respective lower side members 21 are joined to front end portions of the pair of suspension member side rails 20A. Each lower side member 21 is a chamber structure formed in a square tube shape and extends in the vehicle front-rear direction toward the vehicle front from the front end portion of the suspension member side rail 20A.

A lower cross-member 22 is attached to front end portions of the lower side members 21. The lower cross-member 22 extends in the vehicle width direction. As shown in FIG. 1, the lower cross-member 22 is superposed with the front cross-member 18 in the vehicle vertical direction, being disposed at the lower side of the front cross-member 18.

As shown in FIG. 2, rear end portions of the pair of suspension member side rails 20A are linked with linking portions 13. The linking portions 13 are provided integrally with the front side member rear portions 19. The term "integrally" as used here is intended to mean that the linking portions 13 may be formed integrally with the front side member rear portions 19 and that the linking portions 13 may be formed as separate bodies from the front side member rear portions 19 and joined to the front side member rear portions 19.

Figure 3:
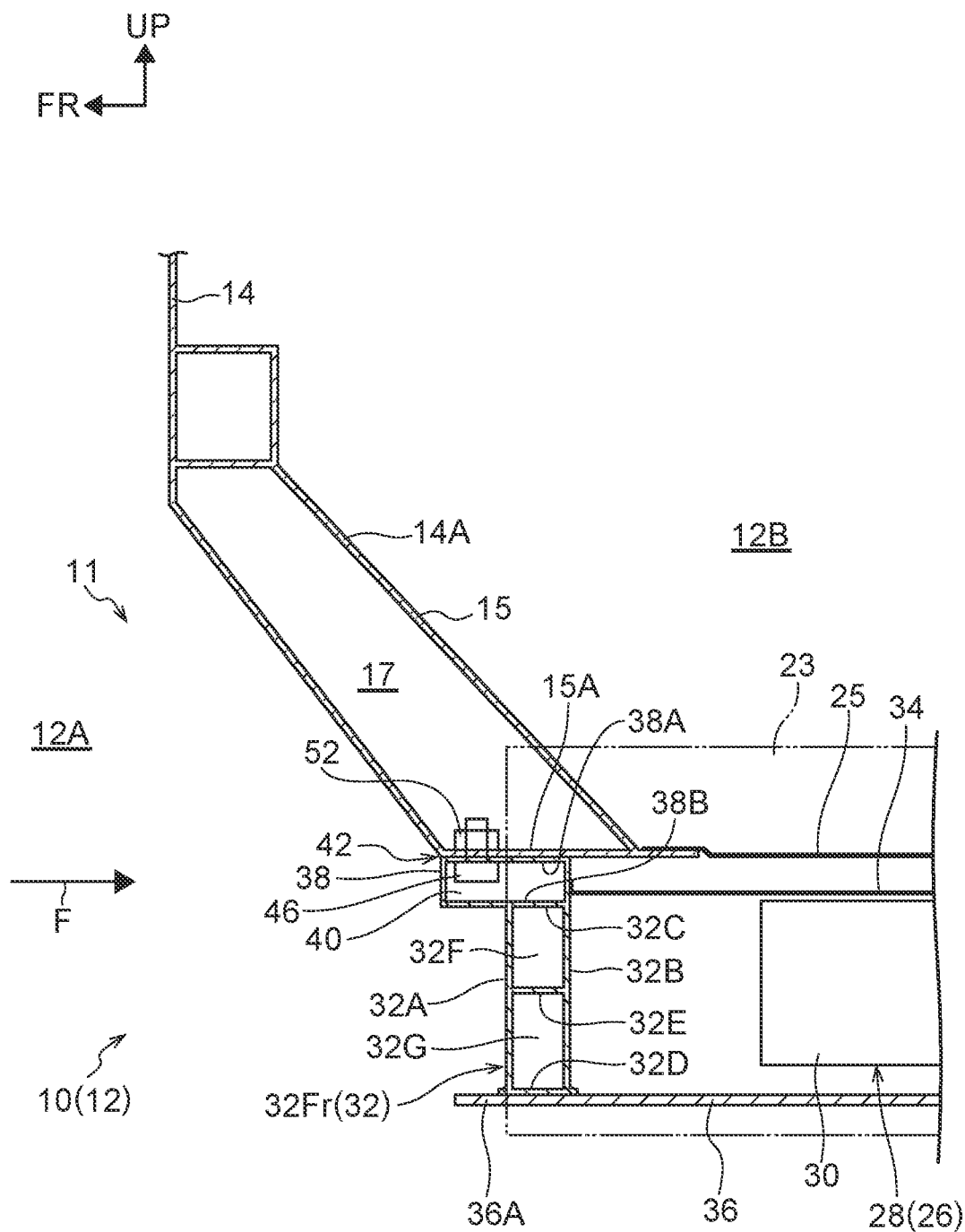
FIG. 3 is a sectional diagram cut along line 3-3 in FIG. 2.

As shown in FIG. 3, a dash cross-member 15 (a first framework member) extends in the vehicle width direction at the side of the kick portion 14A of the dash panel 14 at which the vehicle cabin 12B is provided. The dash cross-member 15 is a vehicle framework member of which a cross-sectional shape, when the dash cross-member 15 is cut along the vehicle front-rear direction, forms a chamber portion 17 (a first chamber portion) between the dash cross-member 15 and the dash panel 14.

Figure 4:
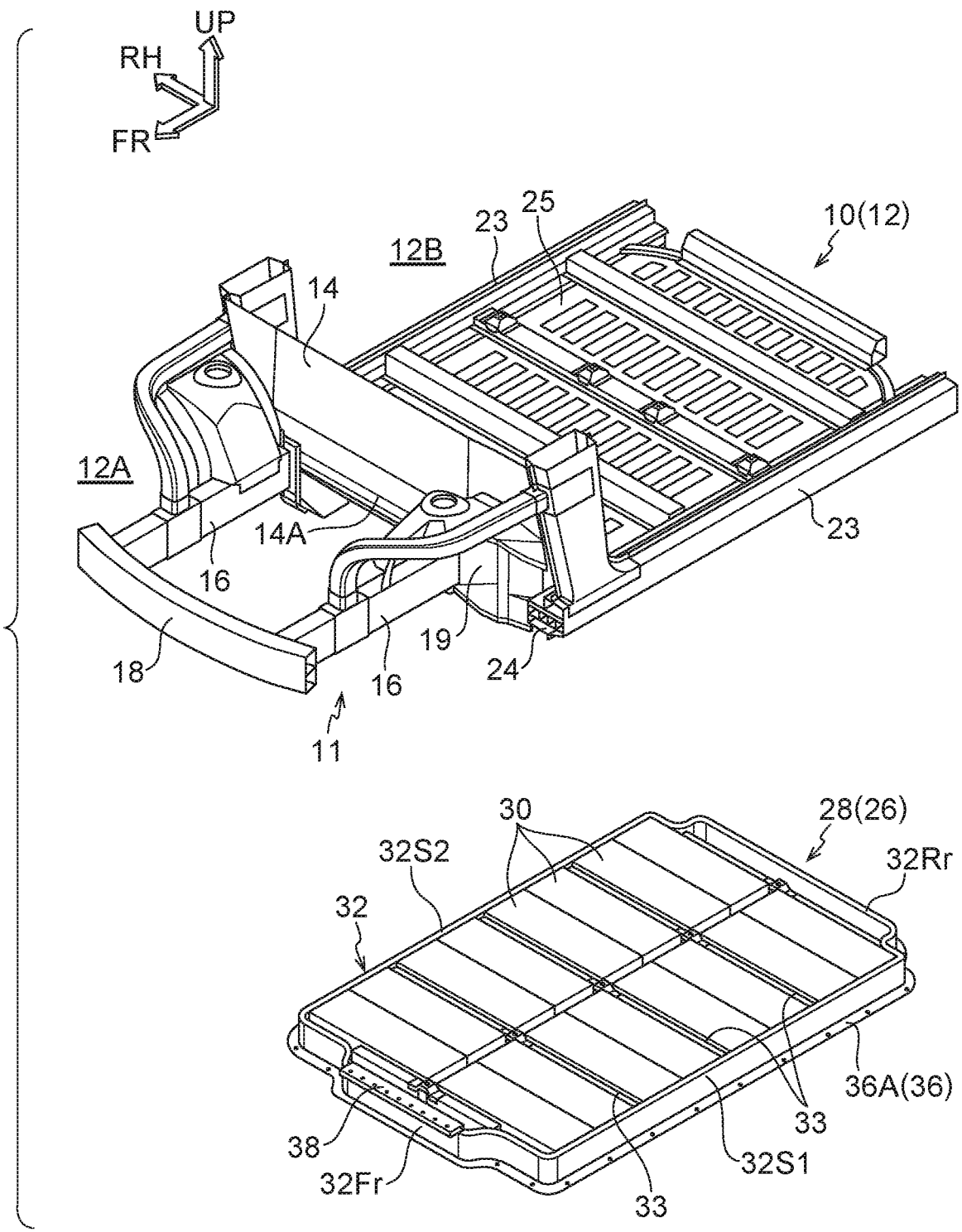
FIG. 4 is an exploded perspective view illustrating structures of the vehicle front portion structure according to the exemplary embodiment.

As shown in FIG. 4, the left and right pair of rockers 23 are provided at both of outer sides in the vehicle width direction of a floor panel 25 that structures a floor portion of the vehicle cabin 12B. The rockers 23 extend in the vehicle front-rear direction. Each of the left and right pair of rockers 23 is a vehicle framework member forming a chamber portion 24. A battery pack 26 is disposed at the lower side of the floor panel 25 between one and the other of the rockers 23. The battery pack 26 is capable of supplying electric power to a power unit such as a motor or the like.

Now, the battery pack 26 is described.

The battery pack 26 is formed in a flat, substantially cuboid shape. The battery pack 26 extends in the vehicle width direction and the vehicle front-rear direction, and is mounted below the floor of the vehicle cabin 12B over substantially the whole area thereof. The battery pack 26 is provided with a battery case 28 formed in a box shape that is longest in the vehicle front-rear direction and flattened in the vehicle vertical direction. A plural number of battery modules 30 are accommodated inside the battery case 28. The battery modules 30 are constituted by plural square storage batteries.

The battery case 28 includes a periphery wall 32, a substantially rectangular frame-shaped ceiling plate 34 (see FIG. 3), and a substantially rectangular floor plate 36. The periphery wall 32 is formed in a substantially rectangular frame shape in plan view. The ceiling plate 34 is provided above the periphery wall 32, and the floor plate 36 is provided under the periphery wall 32. The periphery wall 32 of the battery case 28 is formed by, for example, a long, thin extruded piece that is formed by extrusion molding of a lightweight metal such as an aluminium alloy or the like being bent into the rectangular frame shape and two length direction end portions thereof being joined to one another. As described above, the periphery wall 32 is formed in the substantially rectangular frame shape in plan view. Corner portions of the periphery wall 32 are formed in shapes that are withdrawn towards the inside of the battery case 28, in order to avoid interference with other components.

The ceiling plate 34 of the battery case 28 shown in FIG. 3 is formed by, for example, a plate formed of an aluminium alloy or the like being press-formed, and is joined to the periphery wall 32. The floor plate 36 of the battery case 28 is formed by, for example, a plate formed of an aluminium alloy or the like being press-formed. The floor plate 36 is fixed to a lower face of the periphery wall 32 (to be specific, a lower wall portion 32D, which is described below) by means such as welding, riveting or the like.

A joining flange 36A is provided at the floor plate 36 over the whole periphery of the periphery wall 32. The joining flange 36A projects further to vehicle outer sides in vehicle horizontal directions than the periphery wall 32. Lower wall portions 24A are disposed at the inner sides in the vehicle width direction of the left and right rockers 23 (see FIG. 2). As shown in FIG. 1, the joining flange 36A is fastened together with (joined to) the lower wall portions 24A (at joining portions 27). The battery case 28 (the battery pack 26) is fixed to the rockers 23 via the joining portions 27 in a state in which the battery case 28 is supported from the lower side thereof by the floor plate 36.

As shown in FIG. 4, the periphery wall 32 of the battery case 28 includes a left and right pair of side wall portions 32S1 and 32S2 that oppose one another in the vehicle width direction, a front wall portion 32Fr that links front ends of the side wall portion 32S1 and side wall portion 32S2 with one another, and a rear wall portion 32Rr that links rear ends of the side wall portion 32S1 and side wall portion 32S2 with one another. The front wall portion 32Fr and the rear wall portion 32Rr oppose one another in the vehicle front-rear direction. Plural cross-members 33 span between the side wall portion 32S1 and the side wall portion 32S2. The cross-members 33 are arranged at equal intervals between the front wall portion 32Fr and the rear wall portion 32Rr.

As shown in FIG. 3, a cross section of the periphery wall 32 of the battery case 28 cut along a direction orthogonal to the peripheral direction thereof (the length direction of the aforementioned extruded piece) is formed substantially in a "B" shape. The periphery wall 32 includes an outer periphery wall portion 32A that forms an outer periphery face of the periphery wall 32, an inner periphery wall portion 32B that forms an inner periphery face of the periphery wall 32, an upper wall portion 32C that links upper end portions of the outer periphery wall portion 32A and the inner periphery wall portion 32B in the vehicle horizontal direction, and the lower wall portion 32D, which links lower end portions of the outer periphery wall portion 32A and the inner periphery wall portion 32B in the vehicle horizontal direction.

A vertical direction middle portion between the outer periphery wall portion 32A and the inner periphery wall portion 32B is divided by a dividing wall portion 32E that links the outer periphery wall portion 32A with the inner periphery wall portion 32B in the vehicle horizontal direction. Inside the periphery wall 32, an upper cavity 32F and a lower cavity 32G are partitioned above and below by the dividing wall portion 32E.

As shown in FIG. 4, the front wall portion 32Fr of the periphery wall 32 of the battery case 28 is provided with a joined portion 38 (a second framework member) at the upper end of the front wall portion 32Fr. The joined portion 38 projects toward the vehicle front side in the vehicle horizontal direction from the front wall portion 32Fr. As shown in FIG. 3, a cross-sectional shape of the joined portion 38 cut along a direction substantially orthogonal to the vehicle width direction is formed in a rectangular shape.

That is, the joined portion 38 is a vehicle framework member forming a rectangular chamber portion (a second chamber portion) 40. The joined portion 38 is joined (at a joining portion 42) to the dash cross-member 15 provided at the kick portion 14A of the dash panel 14.

Now, the joining portion 42 is described.

The joining portion 42 includes the joined portion 38 projecting toward the vehicle front side from the front wall portion 32Fr of the periphery wall 32 of the battery case 28. At the joining portion 42, an upper wall portion 38A of the joined portion 38 is superposed with a lower wall portion 15A of the dash cross-member 15.

Although not shown in the drawings, for example, bolt holes are formed in a lower wall portion 38B of the joined portion 38, in a plural number along the periphery wall 32. Bolts 46 can be inserted into these bolt holes from the vehicle lower side. The bolts 46 are inserted into bolt holes formed in the lower wall portion 15A of the dash cross-member 15, which are not shown in the drawings. The bolts 46 passing through the bolt holes can be screwed into nuts 52, which are provided in the chamber portion 17 formed by the dash panel 14 and the dash cross-member 15.

In the state in which the bolts 46 have been screwed into the nuts 52, the joined portion 38 is fastened together with (joined to) the dash cross-member 15 (the dash panel 14) via the bolts 46 and nuts 52 (the joining portion 42). In the exemplary embodiment, as described above, the joined portion 38 of the battery case 28 is joined to the dash cross-member 15. In a broader sense, because the dash cross-member 15 is provided at the dash panel 14, the joined portion 38 is joined to the dash panel 14.

—Operation and Effects of the Vehicle Front Portion Structure—

Now, operation and effects of the vehicle front portion structure 10 according to the exemplary embodiment are described.

As shown in FIG. 3 and FIG. 4, in the exemplary embodiment, the battery pack 26 (the battery case 28) is mounted at the lower side of the floor panel 25 of the vehicle 12. As shown in FIG. 3, the joined portion 38 is provided at the front wall portion 32Fr of the battery case 28, and the joined portion 38 is joined to the dash cross-member 15.

Therefore, during a front collision of the vehicle 12, when a collision load F that is applied from the vehicle front side is transmitted to the battery pack 26, the collision load F is transmitted to the dash cross-member 15 via the joining portion 42 between the battery pack 26 and the dash cross-member 15.

Because the dash cross-member 15 is a vehicle framework member, which forms the chamber portion 17 between the dash cross-member 15 and the dash panel 14, the collision load F may be transmitted by the dash cross-member 15. Because the dash cross-member 15 extends in the vehicle width direction, the collision load F is transmitted in the vehicle width direction via the dash cross-member 15. That is, in the exemplary embodiment, a collision load F applied to a vehicle front portion 11 during a front collision of the vehicle 12 is able to be dispersed via the dash cross-member 15.

In general, the meaning of the term "front collision" as used herein encompasses symmetrical collisions (full overlap collisions), in which the whole of a front face of the vehicle 12 is impacted, and non-symmetrical collisions (offset collisions), in which one side of the front face of the vehicle 12 is impacted. As shown in FIG. 5, in the exemplary embodiment, particularly when an offset collision occurs, a collision load F that is applied to one side (a collision side) of the front face of the vehicle 12 is transmitted (a transmitted load F1) toward the vehicle rear side via the front side member 16, the suspension member side rail 20A of the suspension member 20 and so forth.

The collision load F1 is transmitted to the front side member rear portion 19 provided at the vehicle rear side of the front side member 16. The front side member rear portion 19 is joined to the rocker 23 and the kick portion 14A disposed at the lower portion of the dash panel 14. Therefore, a portion of the transmitted load F1 (a transmitted load F2) is transmitted through the front side member rear portion 19 to a rocker 23A that is the rocker 23 at the collision side. Then, the transmitted load F2 is transmitted (a transmitted load F3) toward the vehicle rear side via the rocker 23A (i.e., one of the rockers 23).

The dash cross-member 15 extends in the vehicle width direction at the kick portion 14A of the dash panel 14. Therefore, another portion of the transmitted load F1 (a transmitted load F4) is transmitted through the dash cross-member 15 to the opposite side from the collision side. The transmitted load F4 is transmitted to the front side member rear portion 19 at the opposite side from the collision side, and is transmitted (a transmitted load F5) through the front side member rear portion 19 to a rocker 23B that is the rocker 23 at the opposite side from the collision side. Then, the transmitted load F5 is transmitted (a transmitted load F6) toward the vehicle rear side via the rocker 23B (i.e., the other of the rockers 23).

That is, according to the exemplary embodiment, a collision load F applied to the vehicle front portion 11 during a front collision of the vehicle 12 may be effectively dispersed between a load transmission path running through arrow F2 to arrow F3 and a load transmission path running through arrow F4 to arrows F5 and F6. The arrows shown in FIG. 5 merely represent directions in which the transmitted loads are transmitted; the lengths of the arrows do not represent magnitudes of the transmitted loads.

In the exemplary embodiment, as shown in FIG. 3, the joined portion 38 is provided at the front wall portion 32Fr of the battery case 28, and the joined portion 38 is a vehicle framework member at which the chamber portion 40 is formed. Therefore, in the state in which the joined portion 38 of the battery case 28 is joined to the dash cross-member 15, the joined portion 38 of the battery case 28 and the dash cross-member 15 are joined via the joining portion 42.

Thus, although not shown in the drawings, stiffness of the vicinity of the joining portion 42 is higher than in a structure in which the dash cross-member 15 is the only vehicle framework member at the joining portion 42. Thus, deformations of the joined portion 38 of the battery case 28 and the dash cross-member 15 are suppressed. In other words, in the exemplary embodiment, load withstand capability of the joining portion 42 is improved and load transmission efficiency is raised.

In the exemplary embodiment, as shown in FIG. 1, the two end portions in the vehicle width direction of the battery pack 26 are joined to the respective rockers 23 via the joining portions 27. Hence, as shown in FIG. 5, a collision load F that is applied to the vehicle front portion 11 during a front collision of the vehicle 12 is dispersed via the dash cross-member 15. In addition, a transmitted load F7 that is transmitted to the battery pack 26 is transmitted in the vehicle width direction via the joined portion 38 that is a vehicle framework member provided at the periphery wall 32 of the battery pack 26 (the battery case 28), and is transmitted to the sides of the rockers 23 joined to the two end portions in the vehicle width direction of the battery pack 26. That is, the collision load F is dispersed more easily than in a structure in which the battery pack 26 is joined only at the front and rear in the vehicle front-rear direction.

In the exemplary embodiment, as shown in FIG. 3, the chamber portion 40 is formed at the joined portion 38 that is provided at the front wall portion 32Fr of the battery case 28. However, it is common for the battery pack 26, including the battery case 28, be formed with a high stiffness. Therefore, the chamber portion 40 is not necessarily required at the joined portion 38.

In the exemplary embodiment, as shown in FIG. 1, the two end portions in the vehicle width direction of the battery pack 26 are joined to the respective rockers 23 via the joining portions 27. However, the disclosure is not limited to this and the two end portions in the vehicle width direction of the battery pack 26 do not necessarily have to be joined to the rockers 23. Further, just one end portion in the vehicle width direction of the battery pack 26 may be joined to the rocker 23.

Hereabove, an exemplary embodiment of the present disclosure has been described, but the present disclosure is not limited by the exemplary embodiment. The exemplary embodiment and various variant examples may be used in suitable combinations, and it will be clear that numerous modes may be embodied within a technical scope not departing from the gist of the present disclosure.

What is claimed is:

1. A vehicle front portion structure comprising:
   a dash cross-member extending in a vehicle width direction at a lower portion in a vehicle vertical direction of a dash panel, the dash panel being configured to partition between a power unit compartment provided at a vehicle front portion and a vehicle cabin, and the dash cross-member being a first framework member of which a cross-sectional shape when cut along the vehicle front-rear direction forms a first chamber portion between the dash cross-member and the dash panel; and
   a battery pack that extends in the vehicle width direction and the vehicle front-rear direction at the vehicle lower side of a floor panel that structures a floor portion of the vehicle cabin, a front end portion in the vehicle front-rear direction of the battery pack being joined to the dash cross-member,
   wherein the dash cross-member further comprises a lower wall portion that forms a bottom portion of the first chamber portion, and an upper surface of the front end portion of the battery pack being directly joined to the lower wall portion of the dash cross-member.

2. The vehicle front portion structure according to claim 1, wherein the front end portion in the vehicle front-rear direction of the battery pack comprises a second framework member of which a cross-sectional shape when cut along the vehicle front-rear direction forms a second chamber portion, and the second framework member being joined to the dash cross-member.

3. The vehicle front portion structure according to claim 1, further comprising a pair of rockers disposed at each of two outer sides in the vehicle width direction of the floor panel, the rockers each extending in the vehicle front-rear direction,
   wherein each of two end portions in the vehicle width direction of the battery pack is joined to the respective rocker.

4. The vehicle front portion structure according to claim 1, wherein a joining portion between the dash cross-member and the front end portion of the battery pack is positioned rearward more than a frontmost surface of the dash panel in the vehicle front-rear direction.

5. The vehicle front portion structure according to claim 3, further comprising:
   a pair of front side members extending in the vehicle front-rear direction at both side portions in the vehicle width direction of the power unit compartment,
   wherein the dash panel further comprises a kick portion at the lower portion, the kick portion being integrally continuous with the dash cross-member, and rear end portions of the front side members are joined to the rockers and to the kick portion.

\* \* \* \* \*